United States Patent
Seon et al.

(10) Patent No.: US 8,560,007 B2
(45) Date of Patent: Oct. 15, 2013

(54) APPARATUS AND METHOD FOR SUPPORTING DIFFERENT TYPES OF UNIVERSAL INTEGRATED CIRCUIT CARDS

(75) Inventors: Yongmun Seon, Kyunggi-do (KR); Sang Deok Kang, Kyunggi-do (KR)

(73) Assignee: KT Corporation, Gyeonggi-do (KR)

( * ) Notice: Subject to any disclaimer, the term of this patent is extended or adjusted under 35 U.S.C. 154(b) by 199 days.

(21) Appl. No.: 13/179,454

(22) Filed: Jul. 8, 2011

(65) Prior Publication Data

US 2012/0009871 A1   Jan. 12, 2012

(30) Foreign Application Priority Data

Jul. 8, 2010 (KR) ........................ 10-2010-0065860

(51) Int. Cl.
*H04M 1/00* (2006.01)
(52) U.S. Cl.
USPC ............. 455/552.1; 455/550.1; 455/13.3; 455/127.4; 343/702
(58) Field of Classification Search
USPC ........... 455/552.1, 550.1, 13.3, 127.4, 553.1, 455/168.1, 144; 343/702
See application file for complete search history.

(56) References Cited

U.S. PATENT DOCUMENTS

| | | | |
|---|---|---|---|
| 5,422,931 A * | 6/1995 | Austin-Lazarus et al. | 455/553.1 |
| 7,095,371 B2 * | 8/2006 | Monebhurrun et al. | 343/700 MS |
| 7,991,429 B2 * | 8/2011 | Chiu | 455/552.1 |
| 8,059,618 B2 * | 11/2011 | Ishida | 370/337 |
| 8,073,400 B2 * | 12/2011 | Gorbachov | 455/83 |
| 8,186,591 B2 * | 5/2012 | Jolivet | 235/439 |
| 8,342,415 B2 * | 1/2013 | Soh et al. | 235/492 |
| 2007/0159399 A1 * | 7/2007 | Perunka et al. | 343/700 MS |
| 2007/0298714 A1 * | 12/2007 | Chiu | 455/41.2 |
| 2008/0144650 A1 * | 6/2008 | Boch et al. | 370/464 |
| 2008/0170534 A1 * | 7/2008 | Ishida | 370/315 |
| 2009/0144456 A1 * | 6/2009 | Gelf et al. | 710/8 |
| 2010/0144276 A1 * | 6/2010 | Chiu | 455/41.2 |
| 2010/0210299 A1 * | 8/2010 | Gorbachov | 455/552.1 |
| 2010/0210300 A1 * | 8/2010 | Rizzo et al. | 455/552.1 |
| 2010/0279734 A1 * | 11/2010 | Karkinen et al. | 455/554.2 |
| 2011/0124285 A1 * | 5/2011 | Teruyama | 455/41.1 |
| 2011/0226853 A1 * | 9/2011 | Soh et al. | 235/380 |
| 2011/0237190 A1 * | 9/2011 | Jolivet | 455/41.2 |
| 2012/0021683 A1 * | 1/2012 | Ma et al. | 455/41.1 |
| 2012/0052801 A1 * | 3/2012 | Kulkarni | 455/41.1 |
| 2012/0077434 A1 * | 3/2012 | Royston | 455/41.1 |
| 2012/0100804 A1 * | 4/2012 | Miles | 455/41.1 |
| 2012/0260119 A1 * | 10/2012 | Garnier et al. | 713/340 |
| 2012/0309302 A1 * | 12/2012 | Buhot | 455/41.1 |
| 2013/0040565 A1 * | 2/2013 | Suzuki | 455/41.1 |

* cited by examiner

*Primary Examiner* — Minh D Dao
(74) *Attorney, Agent, or Firm* — IP Legal Services, LLC

(57) ABSTRACT

Apparatus and method for supporting different types of universal integrated circuit cards (UICCs). A user equipment may include an antenna, a contactless front-end (CLF) unit, an UICC, and a controller. The user equipment may selectively couple one of a the CLF unit and the UICC based on information stored in the UICC. The antenna may transmit to or receive from at least one external device, the CLF unit may provide near field communication (NFC), and the UICC may access a communication network and use a service from the communication network. The controller may determine whether or not NFC is supported by the UICC and selectively couple one of the CLF unit and the UICC to the antenna based on the determination.

20 Claims, 5 Drawing Sheets

APPARATUS AND METHOD FOR SUPPORTING DIFFERENT TYPES OF UNIVERSAL INTEGRATED CIRCUIT CARDS

CROSS REFERENCE TO PRIOR APPLICATIONS

The present application claims priority under 35 U.S.C. §119 to Korean Patent Application No. 10-2010-0065860 (filed on Jul. 8, 2010), which is hereby incorporated by reference in its entirety.

FIELD OF THE INVENTION

Apparatuses and methods consistent with the present invention relate to supporting different types of universal integrated circuit cards (UICCs), and more particularly, to supporting a combi-UICC in a user equipment also supporting an inter-chip universal serial bus (USB) and near field communication (NFC).

BACKGROUND OF THE INVENTION

Near field communication (NFC) is a technology of wirelessly exchanging data between devices separated by a short distance of at most about 10 cm. NFC can be applied to various applications such as credit card payment, money transaction, and authentication. Due to various advantages of NFC, NFC has been adapted to various electronic devices. For example, a user equipment supporting NFC has been introduced and can interact with other devices. The user equipment supporting NFC can read information from other devices separated by a short distance and search for related information in real-time. A user can utilize the user equipment supporting NFC for credit card payment, for money transaction, as a keycard, or as an ID card.

The user equipment supporting NFC may include a contactless front-end (CLF) unit, a processor, and an inductive coupling antenna. In this case, the CLF unit is typically electrically connected to the inductive coupling antenna. Since the user equipment supporting NFC also needs to support inter-chip USB (IC-USB), a fourth contact C4 and an eighth contact C8 of a UICC are used for IC-USB.

Since the contacts C4 and C8 are used for IC-USB, the related art user equipment supporting NFC cannot support a combi-UICC. The combi-UICC may be a UICC having a function of a smart card that provides identification, authentication, data storage, and application processing. When the combi-UICC is placed in a user equipment, the user equipment can be used similarly to a smart card. However, contacts C4 and C8 of the combi-UICC are typically mapped to an antenna. Accordingly, a user cannot use the combi-UICC with the related art user equipment supporting NFC due to the unavailability of contacts C4 and C8.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a user equipment supporting near field communication (NFC) may support different types of universal integrated circuit cards (UICCs).

In accordance with another aspect of the present invention, a user equipment supporting NFC may selectively couple one of a NFC processing module and a UICC to an antenna based on a type of the UICC.

In accordance with an embodiment of the present invention, a user equipment may selectively couple one of a contactless front-end (CLF) unit and a universal integrated circuit card (UICC) based on information stored in the UICC. The user equipment may include an antenna, the CLF unit, the UICC, and a controller. The antenna may transmit to or receive from at least one external device. The CLF unit may provide near field communication (NFC). The UICC may access a communication network and use a service from the communication network. The controller may determine whether or not NFC is supported by the UICC and selectively couple one of the CLF unit and the UICC to the antenna based on the determination.

When the controller determines that the UICC supports NFC, the controller may couple the CLF unit to the antenna and uncouple the UICC from the antenna. When the controller determines that the UICC does not support NFC or when the UICC is a combi-UICC, the controller may couple the UICC to the antenna and uncouple the CLF unit from the antenna.

The user equipment may further include a power supply, a first switching unit, a second switching unit, and a third switching unit. The power supply may supply power. The first switching unit may be coupled between the power supply and the CLF unit. The first switching unit may electrically couple or uncouple the power supply to or from the CLF unit in response to a first control signal sent from the controller. The second switching unit may be coupled between the UICC and the antenna. The second switching unit may electrically couple or uncouple the antenna to or from the UICC in response to a second control signal sent from the controller. The third switching unit may be coupled between the CLF unit and the antenna. The third switching unit may be configured to electrically couple or uncouple the antenna to or from the CLF unit in response to a third control signal sent from the controller.

The controller may determine whether or not the UICC supports NFC, based on the information stored in the UICC. When the controller determines that the UICC supports NFC, the controller may turn on the first switching unit so as to electrically couple the power supply to the CLF unit and turn on the third switching unit so as to electrically couple the CLF unit to the antenna, and may also turn off the second switching unit so as to electrically uncouple the UICC from the antenna. When the controller determines that the UICC does not support NFC or when the UICC is a combi-UICC, the controller may turn on the second switching unit so as to electrically couple the UICC to the antenna, and may also turn off the first switching unit so as to electrically uncouple the power supply from the CLF unit and turn off the third switching unit so as to electrically uncouple the antenna from the CLF unit.

The second switching unit may include a first switch and a second switch. The first switch may be coupled to a first contact of the UICC, and the second switch may be coupled to a second contact of the UICC. The first and second contacts may be allocated for inter-chip universal serial bus (IC-USB) when the UICC supports NFC.

The antenna may include a coupling coil. The third switching unit may include a third switch and a fourth switch. The third switch may have a first end coupled to a first end of the coupling coil. The fourth switch may have a first end coupled to another end of the coupling coil.

The UICC may include a memory and a plurality of contacts. The memory may store configuration information that indicates at least one of whether or not the UICC supports NFC and whether or not the UICC is a combi-UICC. The plurality of contacts may exchange signals with corresponding elements in the user equipment. The plurality of contacts may include a first contact and a second contact allocated for inter-chip universal serial bus (IC-USB), and a third contact allocated for NFC when the UICC supports NFC. The first contact and the second contact may couple the UICC to the antenna when the UICC does not support NFC.

In accordance with another embodiment of the present invention, a universal integrated circuit card (UICC) in a user equipment is supported based on information stored in the UICC. A determination may be made as to whether or not near field communication (NFC) is supported in the user equipment, based on information obtained from the UICC of the user equipment. Based on a result of the determination, an antenna of the user equipment may be selectively coupled to one of a contactless front-end (CLF) unit of the user equipment and the UICC of the user equipment.

When NFC is determined as being supported, power may be supplied to the CLF unit, and the CLF unit may be electrically coupled to the antenna. The power may be supplied to the CLF unit by turning on a first switching unit so as to electrically couple a power supply to the CLF unit, and a third switching unit may be turned on so as to electrically couple the antenna to the CLF unit.

When NFC is determined as being supported, a determination may be made as to whether or not the UICC is electrically coupled to the antenna. The UICC may be electrically uncoupled from the antenna when the UICC is determined to be electrically coupled to the antenna. In order to electrically uncouple the UICC from the antenna, a second switching unit may be turned off. The second switching unit may be coupled to at least one contact of the UICC allocated for inter-chip universal serial bus (IC-USB).

When NFC is determined as not being supported, a determination may be made as to whether or not the UICC is a combi-UICC. The UICC may be electrically coupled to the antenna when the UICC is determined to be a combi-UICC. In order to electrically couple the UICC to the antenna, a second switching unit may be turned on.

When NFC is determined as not being supported, a determination may be made as to whether or not the CLF unit is electrically coupled to the antenna. The CLF unit may be electrically uncoupled from the antenna and the CLF unit may be electrically uncoupled from the power supply, when the CLF unit is determined to be electrically coupled to the antenna. In order to electrically uncouple the CLF unit from the antenna and the power supply, a first switching unit may be turned off so as to electrically uncouple the CLF unit from the power supply, and a third switching unit may be turned off so as to electrically uncouple the CLF unit from the antenna.

In accordance with still another embodiment of the present invention, a universal integrated circuit card (UICC) in a user equipment may be supported based on information in the UICC. A determination may be made as to whether or not near field communication (NFC) is supported in the user equipment, based on information obtained from the UICC of the user equipment. When NFC is determined as being supported, at least one switch may be controlled to enable power to be supplied to a contactless front-end (CLF) unit of the user equipment, the CLF unit may be electrically coupled to an antenna of the user equipment, and the UICC may be electrically uncoupled from the antenna. When NFC is determined as not being supported, at least one switch may be controlled to enable electric coupling between the UICC and the antenna, the power supplied to the CLF unit may be interrupted, and the CLF unit may be electrically uncoupled from the antenna.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
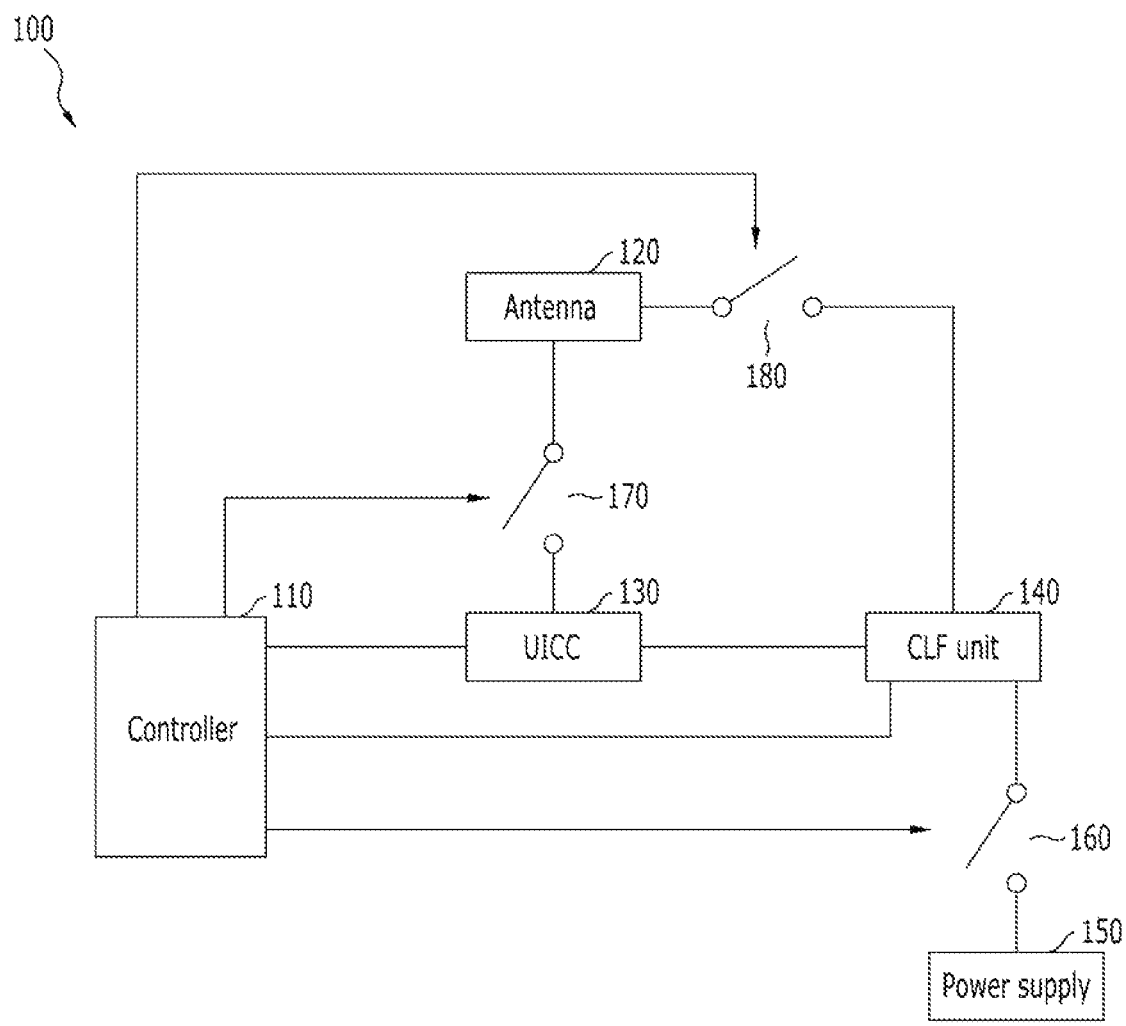
FIG. 1 illustrates a user equipment supporting near field communication (NFC), in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a user equipment supporting near field communication (NFC), in accordance with an embodiment of the present invention.

In accordance with an embodiment of the present invention, a user equipment may selectively couple an antenna to one of a contactless front-end (CLF) unit and a universal integrated circuit card (UICC) based on information stored in the UICC.

Referring to FIG. 1, the user equipment 100 may include a controller 110, an antenna 120, a UICC 130, a CLF unit 140, a power supply 150, a first switching unit 160, a second switching unit 170, and a third switching unit 180.

The UICC 130 may be placed in the user equipment 100 to access a global system for mobile communication (GSM) network or a universal mobile telecommunications system (UMTS) network and to use related services. The UICC 130 may include input/output circuitry, a memory, and a processing unit. The UICC 130 may store at least one application and personal data to access networks and use related services therefrom. For example, the UICC 130 may store a subscriber identity module (SIM) application for the GSM network. The UICC 130 may also store a universal SIM (USIM) application for the UMTS network.

Furthermore, the UICC 130 may store information on supportable applications and networks. The UICC 130 may store information that indicates whether the UICC 130 supports NFC or whether the UICC 130 is a combi-UICC. The combi-UICC may be a UICC having a function of a smart card. The smart card contains a computer chip and enables a user to purchase goods and services, enter restricted areas, access medical, financial, or other records, or perform other operations utilizing data stored on the chip. The smart card may provide any of identification, authentication, data storage, and application processing. The combi-UICC may enable a user of the user equipment in which the combi-UICC is installed to use the user equipment similarly to a smart card. The combi-UICC may be required to be coupled to an antenna in order to communicate with external devices. Accordingly, when the controller 110 determines that a combi-UICC is installed within the user equipment 100, the controller 110 may control switching units 170 to couple the UICC 130 to the antenna 120.

The CLF unit 140 may be a unit that communicates with at least one external device to provide an NFC service. The at least one external device may be a card reader of an automated teller machine (ATM), and the NFC service may be a mobile payment service. The CLF unit 140 may provide a CLF interface to communicate with external devices. For example, the CLF unit 140 may be an NFC chip, an NFC controller, or an NFC router. In an embodiment of the present invention, the CLF unit 140 may be selectively coupled to the antenna 120 through the third switching unit 180. For example, the CLF unit 140 may be electrically coupled to the antenna 120 when the UICC 130 supports NFC. The CLF unit 140 may be electrically uncoupled from the antenna 120 when the UICC 130 does not support NFC or when the UICC 130 is a combi-UICC.

The power supply 150 may provide electric power to constituent elements of the user equipment 100. For example, the power supply 150 may provide electric power to the controller 110, the CLF unit 140, and the UICC 130. The power supply 150 may receive electric power from an external power source (not shown) and deliver the electric power to the constituent elements of the user equipment 100. The power supply 150 may be a power source such as a battery. In an embodiment of the present invention, the power supply 150 may be selectively coupled to the CLF unit 140 through the first switching unit 160, as shown in FIG. 1.

The first switching unit 160 may be disposed between the power supply 150 and the CLF unit 140. The first switching unit 160 may electrically couple the power supply 150 and the CLF unit 140 in response to a control signal of the controller 110. For example, the first switching unit 160 may be turned on, and electric power may be supplied from the power supply 150 to the CLF unit 140 when the UICC 130 supports NFC.

The antenna 120 may transmit signals from the UICC 130 and the CLF unit 140 to an external device or receive signals from an external device for routing to the UICC 130 and the CLF unit 140. In an embodiment of the present invention, the antenna 120 may be selectively coupled to one of the UICC 130 and the CLF unit 140 in response to a control signal of the controller 110. For example, the antenna 120 may be electrically coupled to the UICC 130 when the UICC 130 does not support NFC or when the UICC 130 is a combi-UICC. The antenna 120 may be electrically coupled to the CLF unit 140 when the UICC 130 supports NFC. The antenna 120 may be a loop antenna or a coupling coil, but is not limited thereto. The antenna 120 may also be used for inductive coupling.

The second switching unit 170 may be disposed between the antenna 120 and the UICC 130. The second switching unit 170 may selectively couple the antenna 120 and the UICC 130 in response to a control signal of the controller 110. For example, the second switching unit 170 may electrically couple the antenna 120 and the UICC 130 when the UICC 130 does not support NFC or when the UICC 130 is a combi-UICC.

The third switching unit 180 may be disposed between the antenna 120 and the CLF unit 140. The third switching unit 180 may selectively couple the antenna 120 and the CLF unit 140 in response to a control signal of the controller 110. For example, the third switching unit 180 may electrically couple the antenna 120 and the CLF unit 140 when the UICC 130 supports NFC.

The controller 110 may control overall operation of the user equipment 100. The controller 110 may determine whether the UICC 130 supports NFC or whether the UICC 130 is a combi-UICC based on the information stored in the UICC 130. Based on the determination result, the controller 110 may control the first, second, and third switching units 160, 170, and 180 to selectively couple the power supply 150 to the CLF unit 140 and to selectively couple one of the UICC 130 and the CLF unit 140 to the antenna 120. For example, when the controller 110 determines that the UICC 130 supports NFC, the controller 110 may turn on the first switching unit 160 in order to supply power from the power supply 150 to the CLF unit 140, and turn on the third switching unit 180 for coupling the CLF unit 140 to the antenna 120. When the controller 110 determines that the UICC 130 does not support NFC or when the controller determines that the UICC 130 is a combi-UICC, the controller 110 may turn on the second switching unit 170 for coupling the UICC 130 to the antenna 120.

Figure 2:
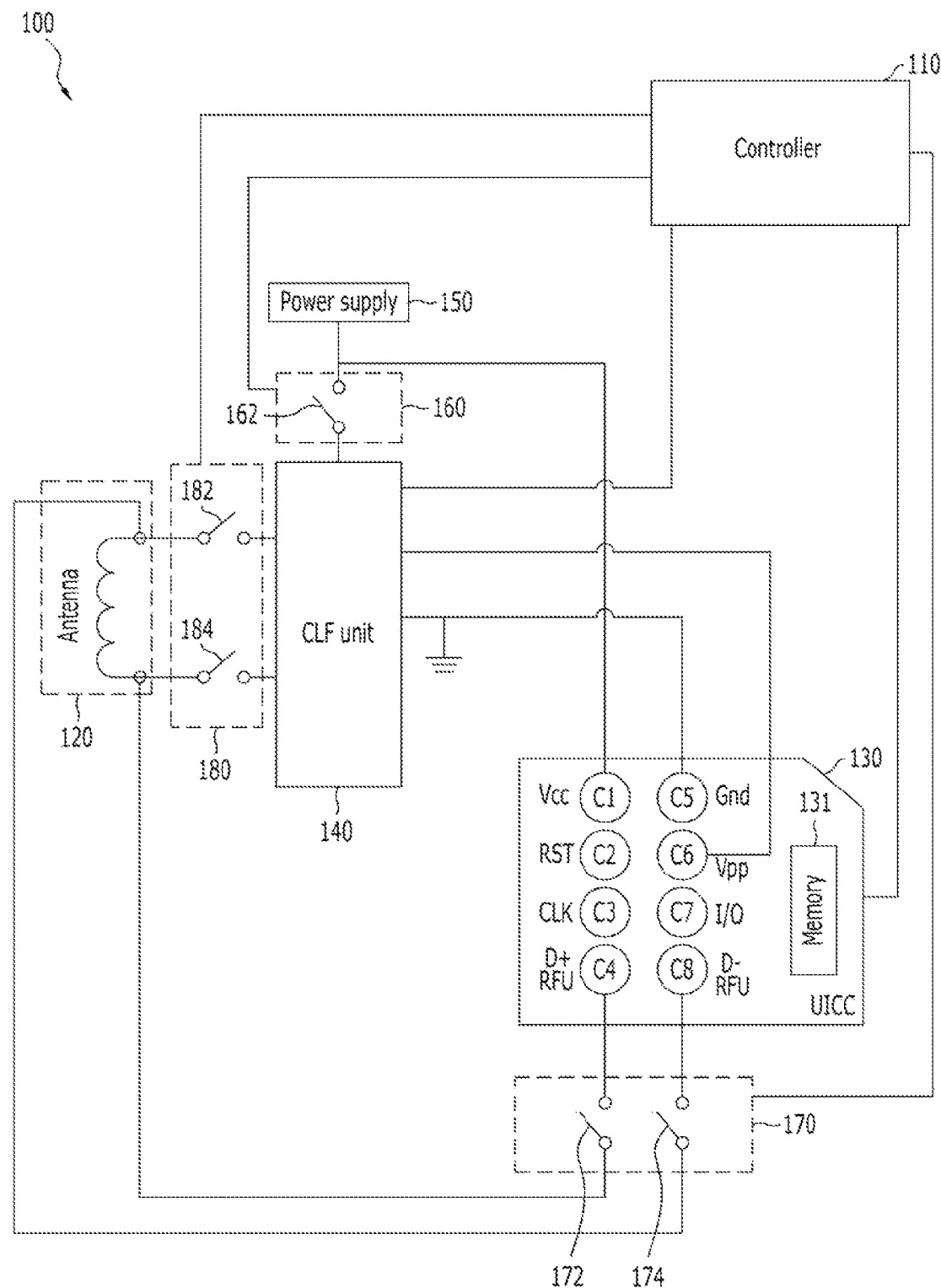
FIG. 2 illustrates, in more detail, the user equipment of FIG. 1, in accordance with an embodiment of the present invention.

FIG. 2 illustrates, in more detail, the user equipment of FIG. 1, in accordance with an embodiment of the present invention.

Referring to FIG. 2, the first switching unit 160 may be electrically coupled between the power supply 150 and the CLF unit 140. The first switching unit 160 may include at least one first switch 162. The first switching unit 160 may electrically couple or uncouple the CLF unit 140 to or from the power supply 150 in response to a control signal from the controller 110. Particularly, when the UICC 130 supports NFC, the first switching unit 160 may be turned on, specifically by closing the first switch 162, so as to form an electric connection between the power supply 150 and the CLF unit 140. Accordingly, power may be supplied to the CLF unit 140. On the contrary, when the UICC 130 does not support NFC or when the UICC 130 is a combi-UICC, the first switching unit 160 may be turned off, specifically by opening the first switch 162, whereby the power supply 150 is disconnected from the CLF unit 140. Accordingly, power is not supplied to the CLF unit 140 in this case.

The second switching unit 170 may be electrically coupled between the UICC 130 and the antenna 120. The second switching unit 170 may electrically couple or uncouple the UICC 130 to or from the antenna 120 in response to a control signal from the controller 110. Particularly, when the UICC 130 does not support NFC or when the UICC 130 is a combi-UICC, the second switching unit 170 may be turned on so as to form an electric connection between the UICC 130 and the antenna 120. When the UICC 130 supports NFC or when the UICC 130 is not a combi-UICC, the second switching unit 170 may be turned off so as to disconnect the UICC 130 from the antenna 120.

The second switching unit 170 may include two switches, a second switch 172 and a third switch 174. The second switch 172 may have one end coupled to a fourth contact C4 of the UICC 130, and the third switch 174 may have one end coupled to an eighth contact C8 of the UICC 130.

The third switching unit 180 may be electrically coupled between the antenna 120 and the CLF unit 140. The third switching unit 180 may electrically couple or uncouple the CLF unit 140 to or from the antenna 120 in response to a control signal from the controller 110. Particularly, when the UICC 130 supports NFC, the third switching unit 180 may be turned on so as to form an electric connection between the CLF unit 140 and the antenna 120. On the contrary, when the UICC 130 does not support NFC or when the UICC 130 is a combi-UICC, the third switching unit 180 may be turned off so as to disconnect the CLF unit 140 from the antenna 120.

The third switching unit 180 may include a fourth switch 182 and a fifth switch 184, as shown in FIG. 2. The fourth switch 182 may have one end coupled to an end of the antenna 120. The fifth switch 184 may have one end coupled to another end of the antenna 120.

The UICC 130 may include a plurality of contacts C1 to C8 and a memory 131, as shown in FIG. 2. The plurality of contacts C1 to C8 may be coupled to peripheral elements and exchange signals. Particularly, the UICC 130 may include a sixth contact C6 assigned for a chip dedicated for NFC according to a single wire protocol. The single wire protocol is a specification for coupling between an integrated circuit card (ICC) and an NFC chip in a user equipment, and may be used for contactless communication. In an embodiment of the present invention, the sixth contact C6 may be coupled to the CLF unit 140 for NFC.

Furthermore, as discussed above, the fourth and eighth contacts C4 and C8 of the UICC 130 may be coupled to the second switching unit 170. For example, the fourth contact C4 may be coupled to one end of the second switch 172, and the eighth contact C8 may be coupled to one end of the third switch 174. Accordingly, the second and third switches 172 and 174 may electrically couple the UICC 130 to the antenna 120 in response to a control signal from the controller 110 when the UICC 130 does not support NFC or when the UICC 130 is a combi-UICC.

The second and third switches 172 and 174 may be opened in order to electrically disconnect the UICC 130 from the antenna 120 when the UICC 130 supports NFC. The UICC 130 supporting NFC also may support IC-USB. The IC-USB may have an operation voltage of about 1.8V and support a maximum data transmit rate of about 12 Mbps. In order to support IC-USB, the fourth and eighth contacts C4 and C8 may be used for IC-USB. Accordingly, when the controller 110 determines that the UICC 130 supports NFC, the controller 110 may disconnect the fourth and eighth contacts C4 and C8 by turning off the second switching unit 170, specifically by opening the second and third switches 172 and 174. After turning off the second switching unit 170, the fourth and eight contacts C4 and C8 may be used for supporting the IC-USB.

As shown in FIG. 2, the UICC 130 may include a memory 131. The memory 131 may store applications, subscriber information, and configuration information. The configuration information may include information on subscriber identification, supportable applications, and available space in the memory 131. Furthermore, the configuration information may indicate whether or not the UICC 130 supports NFC or whether the UICC 130 is a combi-UICC.

The controller 110 may read the configuration information from the memory 131 and determine whether or not a corresponding UICC supports NFC or whether a corresponding UICC is a combi-UICC based on the configuration information. When the controller 110 determines that the UICC 130 supports NFC based on the configuration information, the controller 110 may generate a control signal that turns on the first switching unit 160, specifically by closing the first switch 162, in order to supply power to the CLF unit 140 and turns on the third switching unit 180, specifically by closing the fourth and fifth switches 182 and 184, in order to electrically couple the CLF unit 140 to the antenna 120. The controller 110 may also generate a control signal that turns off the second switching unit 170, specifically by opening the second and third switches 172 and 174, so as to disconnect the UICC 130 from the antenna 120.

When the controller 110 determines that the UICC 130 does not support NFC or that the UICC 130 is a combi-UICC based on the configuration information, the controller 110 may generate a control signal that turns on the second switching unit 170, specifically by closing the second and third switches 172 and 174, so as to electrically couple the UICC 130 to the antenna 120. The controller 110 may generate a control signal that turns off the first switching unit 160, specifically by opening the first switch 162, so as to interrupt power supplied by the power supply 150 to the CLF unit 140, and generate a control signal that turns off the third switching unit 180, specifically by opening the fourth and fifth switches 182 and 184, so as to disconnect the CLF unit 140 from the antenna 120.

Figure 3:
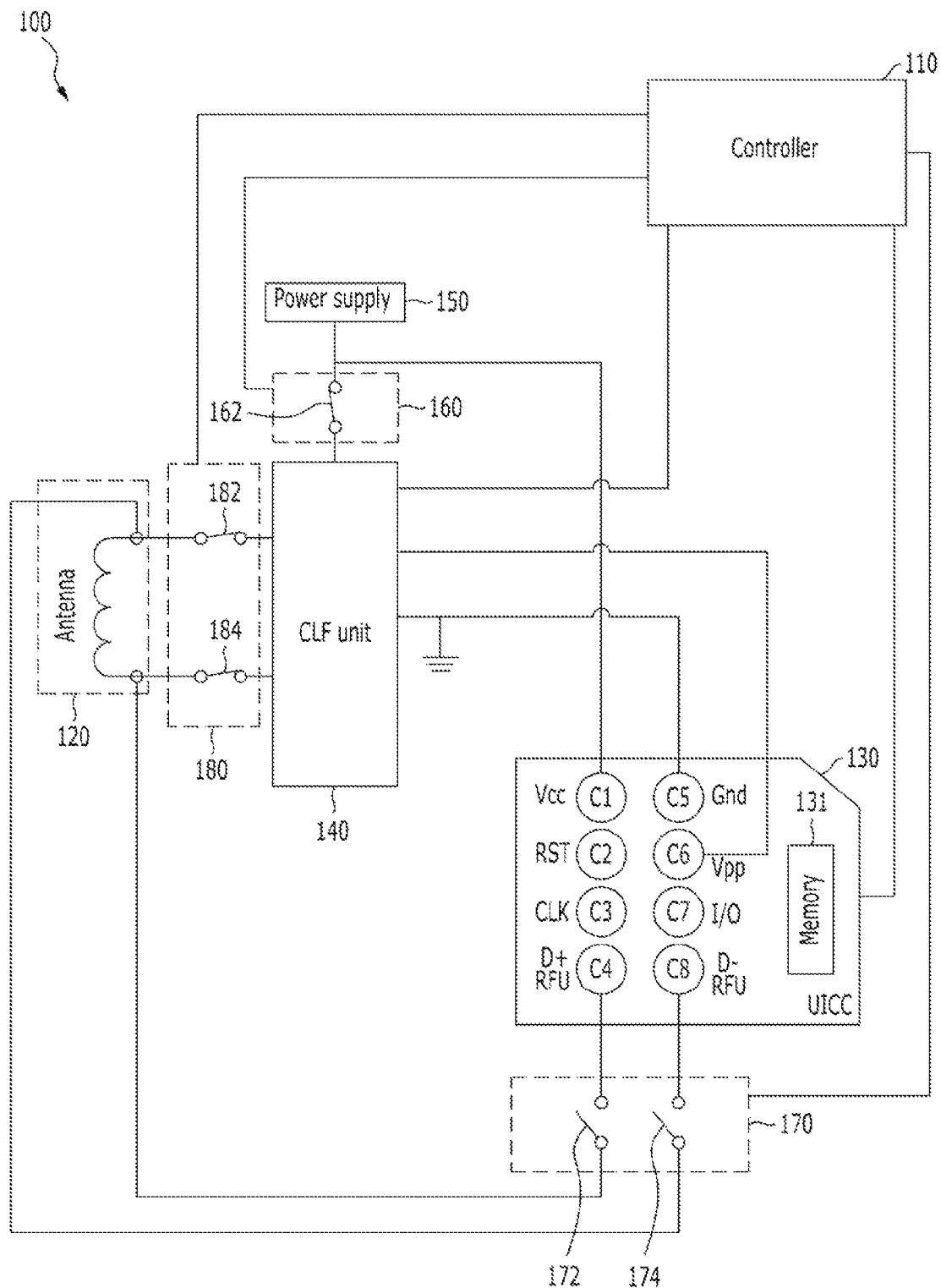
FIG. 3 illustrates the user equipment having a UICC and configured to support NFC, in accordance with an embodiment of the present invention.

FIG. 3 illustrates the user equipment having the UICC and configured to support NFC, in accordance with an embodiment of the present invention.

When the UICC 130 is installed within the user equipment 100, the controller 110 may read configuration information stored in the memory 131 of the UICC 130. The controller 110 may determine whether or not the UICC 130 supports NFC or whether the UICC 130 is a combi-UICC based on the read configuration information. When the controller 110 determines that the UICC 130 supports NFC, the controller 110 may activate an NFC function. In order to activate the NFC function, the controller 110 may supply power to the CLF unit 140 and electrically couple the CLF unit 140 to the antenna 120.

In order to supply power to the CLF unit 140, the controller 110 may generate a control signal to turn on the first switching unit 160. In response to the control signal, the first switching unit 160 may be turned on, specifically by closing the first switch 162, to electrically couple the CLF unit 140 to the power supply 150, as shown in FIG. 3. Accordingly, power from the power supply 150 may be supplied to the CLF unit 140.

In addition to turning on the first switching unit 160, the controller 110 may turn on the third switching unit 180 in order to electrically couple the CLF unit 140 to the antenna 120, as shown in FIG. 3. Particularly, the controller 110 may close the fourth and fifth switches 182 and 184 of the third switching unit 180. Accordingly, the fourth switch may be electrically coupled to one end of the antenna 120, and the fifth switch may be electrically coupled to another end of the antenna 120.

With activation of the NFC function, the controller 110 may also turn off the second switching unit 170, specifically by opening the second and third switches 172 and 174, because the antenna 120 would be operating for the CLF unit 140. Furthermore, it may be required to turn off the second switching unit 170 in order to release the fourth and eighth contacts C4 of C8 of the UICC 130, as shown in FIG. 3. As described above, the fourth and eighth contacts C4 and C8 may be coupled to ends of the second switch 172 and third switch 174 respectively of the second switching unit 170. The UICC 130 supporting NFC also may support IC-USB. In order to support IC-USB, the fourth and eighth contacts C4 and C8 may be used for IC-USB. Accordingly, when the controller 110 determines that the UICC 130 supports NFC, the controller 120 may disconnect the fourth and eighth contacts C4 and C8 from the antenna 120 by turning off the second switching unit 170, specifically by opening the second and third switches 172 and 174, and the fourth and eight contacts C4 and C8 may then be used for supporting IC-USB.

Figure 4:
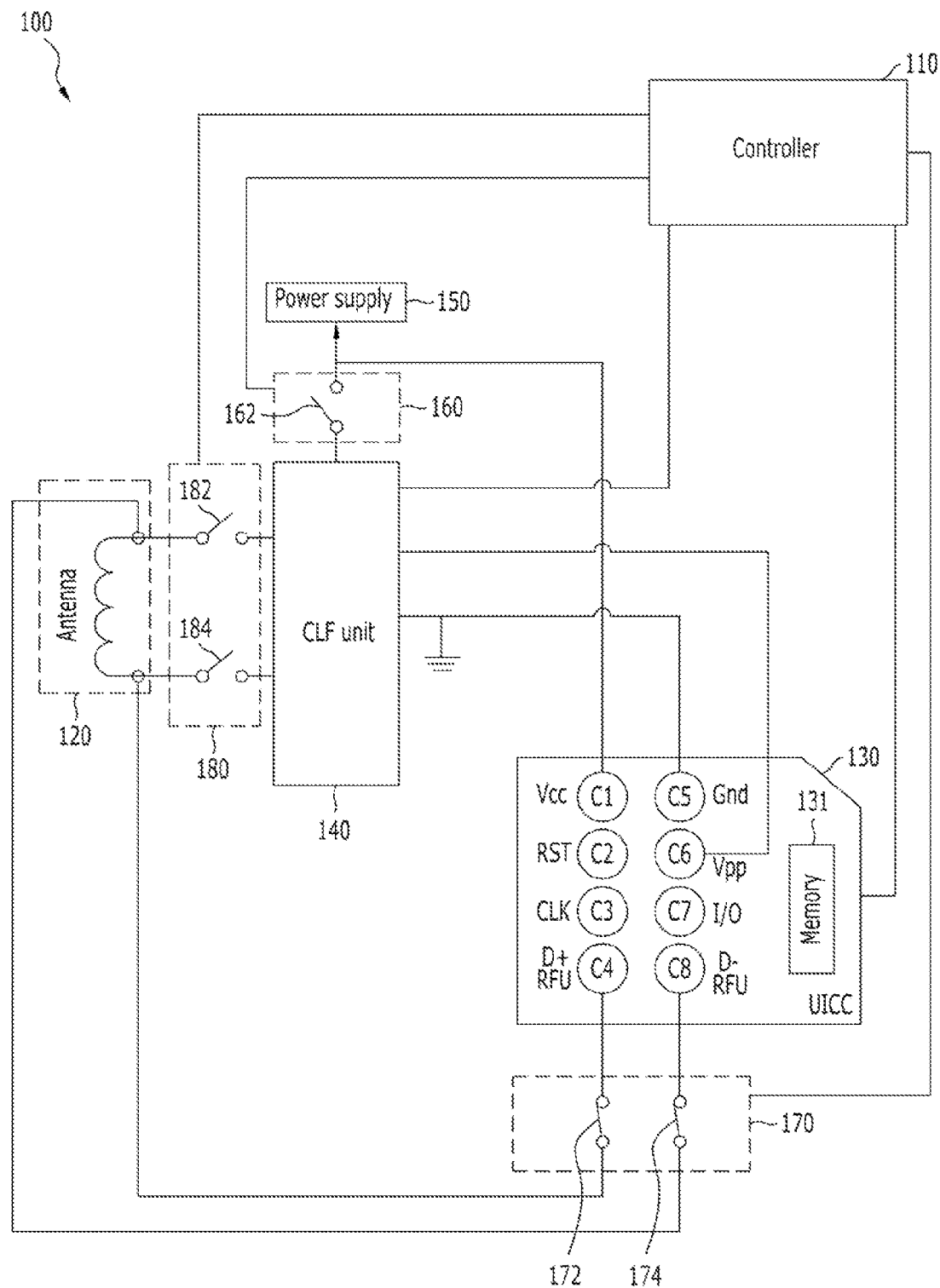
FIG. 4 illustrates the user equipment having the UICC when support for NFC is turned off, in accordance with an embodiment of the present invention.

FIG. 4 illustrates the user equipment having the UICC when support for NFC is turned off, in accordance with an embodiment of the present invention.

When the UICC 130 is installed within the user equipment 100, the controller 110 may read configuration information stored in the memory 131 of the UICC 130. The controller 110 may determine whether or not the UICC 130 supports NFC or whether the UICC 130 is a combi-UICC based on the read configuration information. When the controller 110 determines that the UICC 130 does not support NFC or that the UICC 130 is a combi-UICC, the controller 110 may electrically couple the UICC 130 to the antenna 120.

In more detail, the controller 110 may generate a control signal to turn on the second switching unit 170. In response to the control signal, the second switching unit 170 may be turned on, specifically by closing the second and third switches 172 and 174, and the UICC 130 may thus be electrically coupled to the antenna 120 through the second switching unit 170.

In order to couple the UICC 130 to the antenna 120, the fourth and eighth contacts C4 and C8 may be used. As described above, the fourth and eighth contacts C4 and C8 may be used for IC-USB. Since the UICC 130 does not support NFC in this case, the fourth and eighth contacts C4 and C8 may be used to electrically couple the UICC 130 to the antenna 120. When a user places the user equipment 100 in proximity to a card reader, an electric field may be formed between the loop antenna and the card reader, and induced electricity may be generated. Such induced electricity flows inside the user equipment 100 and operates the UICC 130.

In addition to turning on the second switching unit 170, specifically by closing the second and third switches 172 and 174, the controller 110 may turn off the third switching unit 180, specifically by opening the fourth and fifth switches 182 and 184, because the antenna 120 may be required for operation of the UICC 130. The controller 110 may determine whether or not the antenna 120 is electrically coupled to the CLF unit 140. When the controller 110 determines that the antenna 120 is electrically coupled to the CLF unit 140, the controller 110 may turn off the third switching unit 180, specifically by opening the fourth and fifth switches 182 and 184, in order to disconnect the antenna 120 from the CLF unit 140. Furthermore, the controller 110 may turn off the first switching unit 160, specifically by opening the first switch 162, in order to disconnect the power supply 150 from the CLF unit 140.

Figure 5:
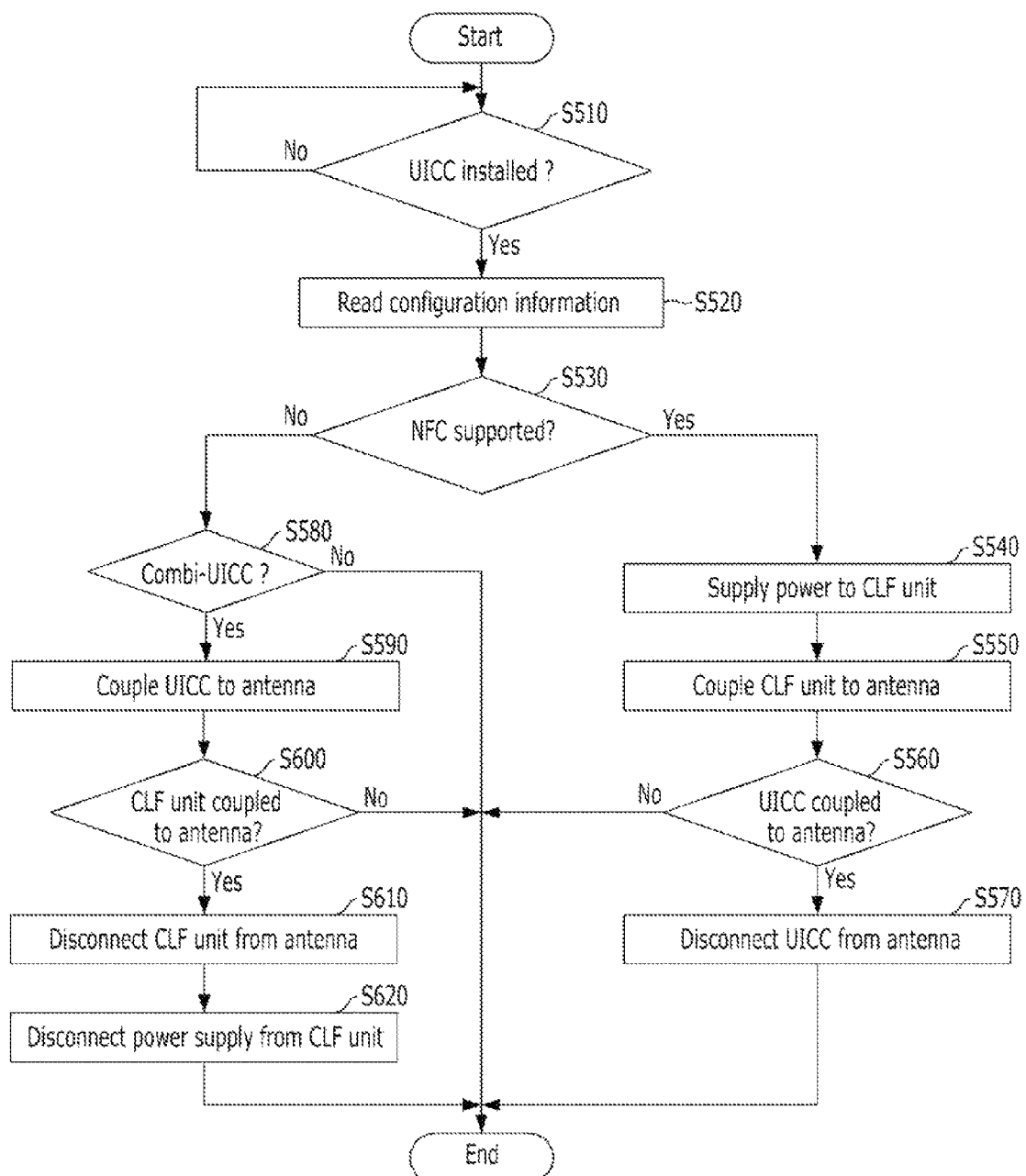
FIG. 5 illustrates a method for supporting different types of UICCs in a user equipment, in accordance with an embodiment of the present invention.

FIG. 5 illustrates a method for supporting different types of UICCs in a user equipment, in accordance with an embodiment of the present invention.

Referring to FIG. 5, a determination may be made as to whether or not the UICC 130 is installed within the user equipment 100 S510. When the UICC 130 is installed, information stored in the memory 131 of the UICC 130 may be read S520. For example, the information stored in the memory 131 may include configuration information that indicates whether or not the UICC 130 supports NFC or whether the UICC 130 is a combi-UICC.

After reading the configuration information, a determination may be made as to whether or not the UICC 130 supports NFC based on the configuration information S530. For example, the controller 110 may determine whether or not the UICC 130 supports NFC based on the configuration information read from the memory 131 of the UICC 130.

When the UICC 130 supports NFC (S530-Yes), power may be supplied to the CLF unit 140 S540. For example, the controller 110 may turn on the first switching unit 160. The first switching unit 160 may electrically couple the power supply 150 and the CLF unit 140. As a result, power may be supplied from the power supply 150 to the CLF unit 140.

The CLF unit 140 may also be electrically coupled to the antenna 120 S550. For example, the controller 110 may turn on the third switching unit 180. The third switching unit 180 may electrically couple the antenna 120 and the CLF unit 140.

A determination may be made as to whether or not the UICC 130 is coupled to the antenna 120 S560. For example, the controller 110 may determine whether or not the UICC 130 is coupled to the antenna 120.

When the UICC 130 is coupled to the antenna 120 (S560-Yes), the UICC 130 may be uncoupled from the antenna 120 S570. For example, the controller 110 may turn off the second switching unit 170 in order to electrically disconnect the UICC 130 from the antenna 120.

When the UICC 130 does not support NFC (S530-No), a determination may be made as to whether the UICC 130 is a combi-UICC S580. For example, the controller 110 may determine whether or not the UICC 130 is a combi-UICC based on the configuration information read from the memory 131 of the UICC 130.

When the UICC 130 is determined to be a combi-UICC (S580-Yes), the antenna 120 may be coupled to the UICC 130 S590. For example, the controller 110 may turn on the second switching unit 170 in order to electrically couple the UICC 130 to the antenna 120.

A determination may be made as to whether or not the CLF unit 140 is coupled to the antenna 120 S600. When the CLF unit 140 is coupled to the antenna 120 (S600-Yes), the antenna 120 may be electrically disconnected from the CLF unit 140 S610 and the power supply 150 may be electrically disconnected from the CLF unit 140 S620.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A user equipment comprising:
    an antenna configured to transmit to or receive from at least one external device;
    a contactless front-end (CLF) unit configured to provide near field communication (NFC);
    a universal integrated circuit card (UICC) configured to access a communication network and to use a service from the communication network; and
    a controller configured to determine whether or not the UICC supports NFC, based on the information stored in the UICC and to selectively couple one of the CLF unit and the UICC to the antenna, based on a result of the determining.

2. The user equipment of claim 1, wherein:
    the controller is configured to couple the CLF unit to the antenna, when the controller determines that the UICC supports NFC; and the controller is configured to couple the UICC to the antenna, when the controller determines that the UICC does not support NFC or when the UICC is a combi-UICC.

3. The user equipment of claim 2, wherein:
the controller is configured to uncouple the CLF unit from the antenna, when the controller determines that the UICC does not support NFC or when the UICC is a combi-UICC; and
the controller is configured to uncouple the UICC from the antenna, when the controller determines that the UICC supports NFC.

4. The user equipment of claim 1, further comprising:
a power supply configured to supply power;
a first switching unit coupled between the power supply and the CLF unit and configured to electrically couple or uncouple the power supply to or from the CLF unit in response to a first control signal sent from the controller;
a second switching unit coupled between the UICC and the antenna, and configured to electrically couple or uncouple the antenna to or from the UICC in response to a second control signal sent from the controller; and
a third switching unit coupled between the CLF unit and the antenna, and configured to electrically couple or uncouple the antenna to or from the CLF unit in response to a third control signal sent from the controller.

5. The user equipment of claim 4, wherein:
the controller is configured to determine whether or not the UICC supports NFC, based on the information stored in the UICC;
the controller is configured to turn on the first switching unit so as to electrically couple the power supply to the CLF unit and turn on the third switching unit so as to electrically couple the CLF unit to the antenna, when the controller determines that the UICC supports NFC; and
the controller is configured to turn on the second switching unit so as to electrically couple the UICC to the antenna, when the controller determines that the UICC does not support NFC or when the UICC is a combi-UICC.

6. The user equipment of claim 4, wherein:
the controller is configured to turn off the second switching unit so as to electrically uncouple the UICC from the antenna, when the controller determines that the UICC supports NFC; and
the controller is configured to turn off the first switching unit so as to electrically uncouple the power supply from the CLF unit and turn off the third switching unit so as to electrically uncouple the antenna from the CLF unit, when the controller determines that the UICC does not support NFC or when the UICC is a combi-UICC.

7. The user equipment of claim 4, wherein the second switching unit comprises:
a first switch coupled to a first contact of the UICC; and
a second switch coupled to a second contact of the UICC, wherein the first and second contacts are allocated for inter-chip universal serial bus (IC-USB) when the UICC supports NFC.

8. The user equipment of claim 4, wherein the antenna comprises a coupling coil, and
wherein the third switching unit comprises:
a third switch having a first end coupled to a first end of the coupling coil; and
a fourth switch having a first end coupled to another end of the coupling coil.

9. The user equipment of claim 1, wherein the UICC comprises:

a memory configured to store configuration information that indicates at least one of whether or not the UICC supports NFC and whether or not the UICC is a combi-UICC; and
a plurality of contacts configured to exchange signals with corresponding elements in the user equipment,
wherein the plurality of contacts comprises a first contact and a second contact allocated for inter-chip universal serial bus (IC-USB), and a third contact allocated for NFC when the UICC supports NFC, and
wherein the first contact and the second contact are configured to couple the UICC to the antenna when the UICC does not support NFC.

10. A method for supporting a universal integrated circuit card (UICC) in a user equipment, the method comprising:
determining whether or not near field communication (NFC) is supported in the user equipment, based on information obtained from the UICC of the user equipment; and
selectively coupling an antenna of the user equipment to one of a contactless front-end (CLF) unit of the user equipment and the UICC of the user equipment, based on a result of the determining.

11. The method of claim 10, wherein when NFC is determined as being supported, the selectively coupling comprises:
supplying power to the CLF unit; and
electrically coupling the CLF unit to the antenna.

12. The method of claim 11, wherein power is supplied to the CLF unit by turning on a first switching unit so as to electrically couple a power supply to the CLF unit.

13. The method of claim 11, wherein the electrically coupling the CLF unit to the antenna comprises turning on a third switching unit so as to electrically couple the antenna to the CLF unit.

14. The method of claim 11, wherein when NFC is determined as being supported, the selectively coupling further comprises:
determining whether or not the UICC is electrically coupled to the antenna; and
electrically uncoupling the UICC from the antenna when the UICC is determined to be electrically coupled to the antenna.

15. The method of claim 14, wherein a second switching unit is coupled to at least one contact of the UICC allocated for inter-chip universal serial bus (IC-USB), and wherein the electrically uncoupling the UICC from the antenna comprises turning off the second switching unit so as to electrically uncouple the antenna from the UICC.

16. The method of claim 10, wherein when NFC is determined as not being supported, the selectively coupling comprises:
determining whether or not the UICC is a combi-UICC; and
electrically coupling the UICC to the antenna when the UICC is determined to be a combi-UICC.

17. The method of claim 16, wherein the electrically coupling the UICC to the antenna comprises turning on a second switching unit so as to electrically couple the UICC to the antenna.

18. The method of claim 16, wherein when NFC is determined as not being supported, the selectively coupling further comprises:
determining whether or not the CLF unit is electrically coupled to the antenna; and
electrically uncoupling the CLF unit from the antenna and electrically uncoupling the CLF unit from the power supply, when the CLF unit is determined to be electrically coupled to the antenna.

19. The method of claim 18, wherein the electrically uncoupling the CLF unit from the antenna and electrically uncoupling the CLF unit from the power supply comprises:
turning off a first switching unit so as to electrically uncouple the CLF unit from the power supply; and
turning off a third switching unit so as to electrically uncouple the CLF unit from the antenna.

20. A method for supporting a universal integrated circuit card (UICC) in a user equipment, the method comprising:
determining whether or not near field communication (NFC) is supported in the user equipment, based on information obtained from the UICC of the user equipment;
when NFC is determined as being supported, controlling at least one switch to enable power to be supplied to a contactless front-end (CLF) unit of the user equipment, electrically coupling the CLF unit to an antenna, and electrically uncoupling the UICC from the antenna; and
when NFC is determined as not being supported, controlling at least one switch to enable electric coupling between the UICC and the antenna, interrupting the power supplied to the CLF unit, and electrically uncoupling the CLF unit from the antenna.

* * * * *